W. N. BOOTH.
DEMOUNTING DEVICE.
APPLICATION FILED JUNE 14, 1910.
1,146,301.
Patented July 13, 1915
2 SHEETS—SHEET 1.
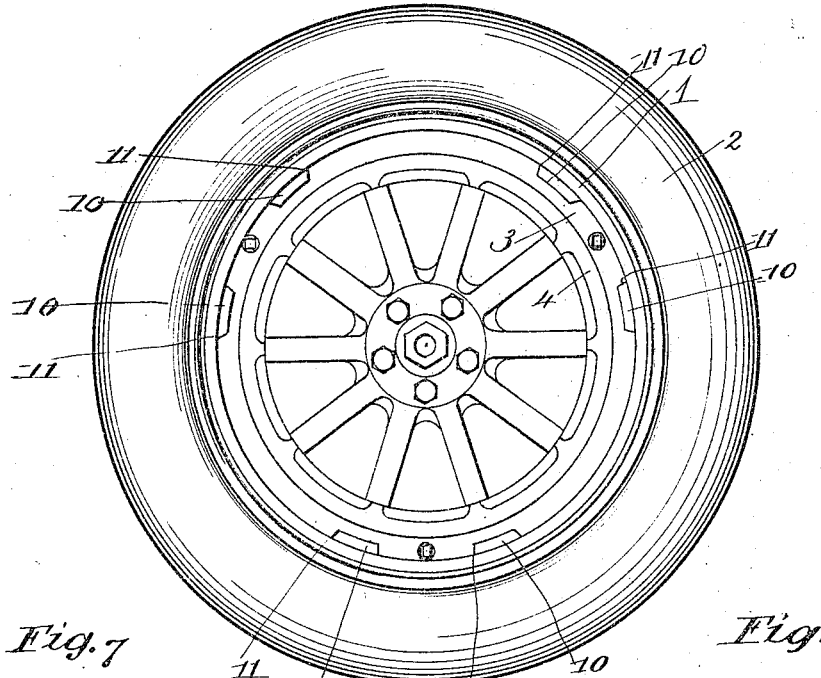
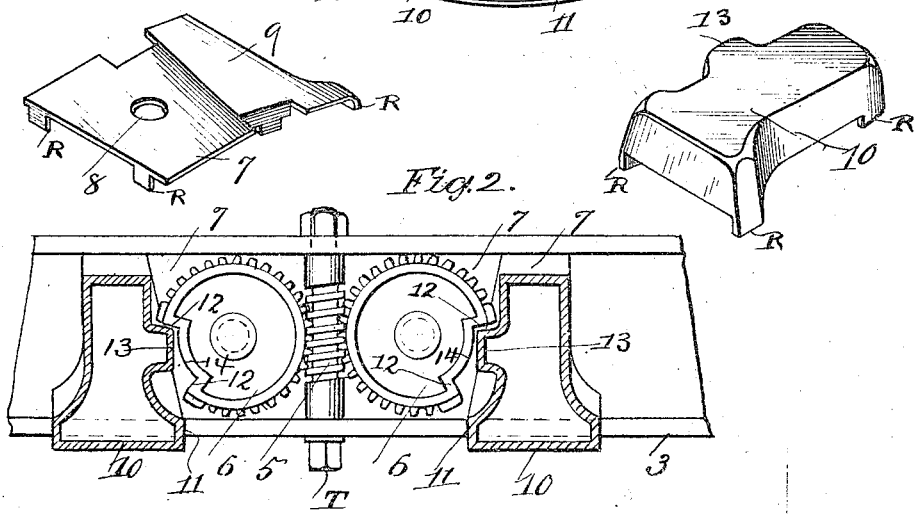
Witnesses
Inventor
William N. Booth
Attorney W. N. BOOTH.
DEMOUNTING DEVICE.
APPLICATION FILED JUNE 14, 1910.
1,146,301.
Patented July 13, 1915.
2 SHEETS—SHEET 2.
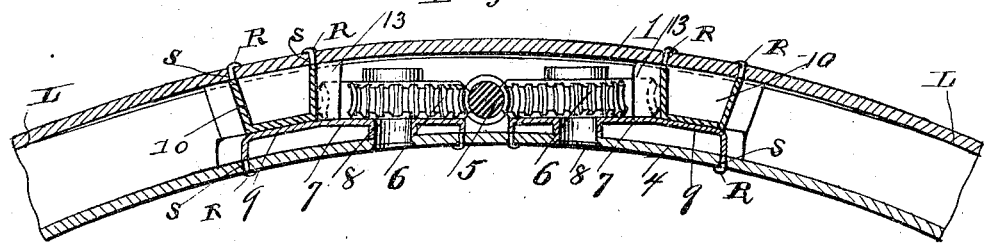
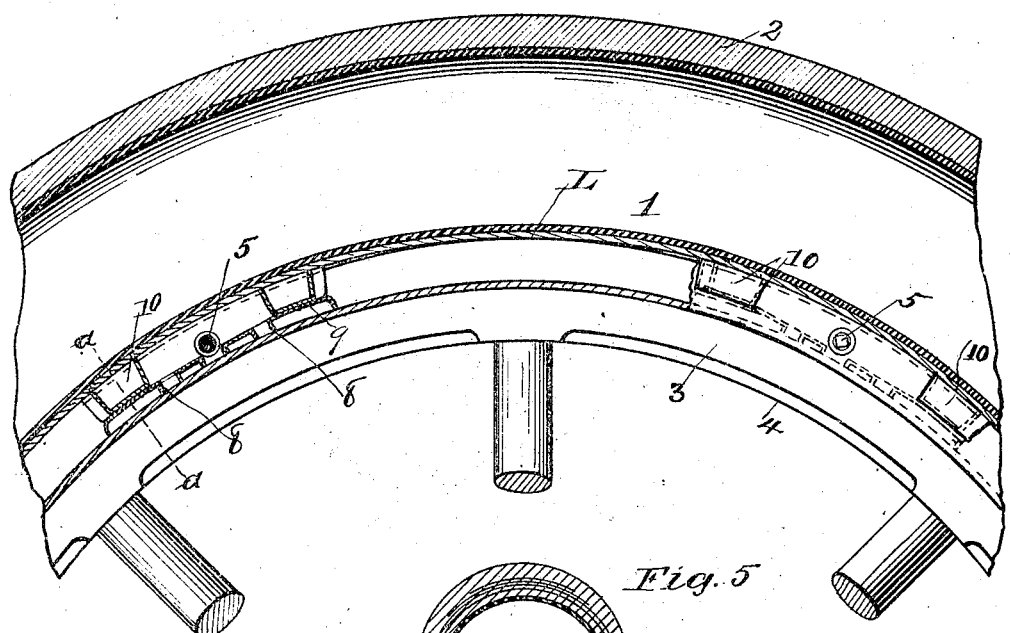
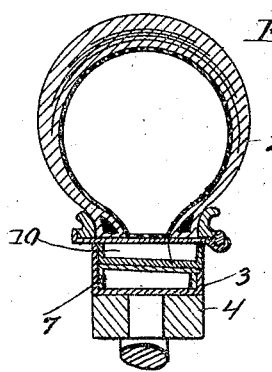

UNITED STATES PATENT OFFICE.

WILLIAM N. BOOTH, OF CLEVELAND, OHIO, ASSIGNOR TO THE BOOTH DEMOUNTABLE RIM COMPANY, OF CLEVELAND, OHIO, A CORPORATION OF OHIO.

DEMOUNTING DEVICE.

1,146,301.  Specification of Letters Patent.  Patented July 13, 1915.

Application filed June 14, 1910. Serial No. 566,753.

*To all whom it may concern:*

Be it known that I, WILLIAM N. BOOTH, a citizen of the United States, and resident of Cuyahoga, in the county of Cuyahoga and State of Ohio, have invented certain new and useful Improvements in Demounting Devices, of which I hereby declare the following to be a full, clear, and exact description, such as will enable others skilled in the art to which it appertains to make and use the same.

The objects of the invention are to provide equalizing devices for applying transverse pressure in opposite directions simultaneously to adjacent members of a demountable rim, for the purpose of attaching the outer rim to the inner rim which is mounted on the felly of an automobile wheel and for removing the outer rim therefrom.
These equalizing devices for applying power to the said rim are also so spaced apart upon the rim and so constructed as to produce a circumferential pressure upon a rigid inner rim of the wheel member which is mounted on the felly. This pressure is applied at regular intervals, in such a manner as to cause the outer rim to buckle inwardly at points intermediately between the equalizing devices, and thus insure the positive engagement of the rims at intermediate points as well as at the points of engagement of the equalizing devices.

The invention comprises also the construction of the engaging members of sheet metal to obtain lightness thereof and providing them with inclined or wedging surfaces to produce the circumferential pressure described.

The invention is also an improvement upon the invention described in Letters Patent No. 954,416, for demountable rim for automobile tires, granted to me on April 12, 1910, in which equalizing devices of similar character were shown constructed of solid metal, and incapable of exerting the circumferential pressure herein described. The invention comprising the combination and arrangement of parts and construction of details as hereinafter described, shown in the accompanying drawings and specifically pointed out in the claims.

In the accompanying drawings Figure 1 is a side elevation of the device; Fig. 2 is a transverse section, taken circumferentially between the outer and inner rim members showing one equalizing pressure device mounted upon the inner rim member, and the sheet metal blocks simultaneously engaged thereby to operate the other rim member; Fig. 3 is a longitudinal vertical section through the rim members showing the detail construction of one of the equalizing devices; Fig. 4 is a similar longitudinal section showing two equalizing devices and their effect in buckling the outer rim by means of the circumferential pressure thereon caused by the action of the wedging blocks in the equalizing devices; Fig. 5 is a transverse section taken through the tire and rim and through a pair of compression wedges; Fig. 6 is a perspective view of one of the wedges attached to the outer rim; Fig. 7 is a similar view of one of the wedge shaped platforms upon which the worm gears of the equalizing device is mounted.

In these views 1 is the outer rim member which is attached in any convenient manner to the pneumatic tire 2. 3 is the inner rim member mounted on the felly 4 of the wheel. The rim 1 is of slightly larger diameter than the periphery of the inner rim, so that when compressed at one point it will project at another point as shown in Fig. 4.

The rim 3 is channel shaped in cross section and rigid as shown in Fig. 5 and formed of thin spring metal such as thin steel and secured within the channel at regular intervals, and preferably three in number are the pressure applying and equalizing devices by means of which the rim members are forcibly separated and drawn together. These devices each consist of the worm screw 5 mounted in the sides of the channel, upon each side of which is shown a worm wheel or disk 6 engaging therewith, each wheel is mounted upon a sheet metal platform 7, the wheels being closely adjacent and pivoted in the platforms at 8, 8.

The wheels are mounted upon a plane substantially at right angles to the radius passing through the worm screw 4 and each platform is provided with a lateral extension 9 at each end joining the platforms at a slight angle and having inclined faces, see Fig. 5. Upon the lateral extensions 9, 9 move the sheet metal blocks or hollow lugs 10, 10, which are attached to the outer rim members 1, and have inclined faces corresponding to the inclined faces of the platform, and enter the channel of the inner rim through the lateral openings 11, 11 in one wall thereof; each block 10 is provided with a lateral extension 13 engaged in turn by the shoulders 12, 12 upon the worm wheels, which to give a compact form to the device are formed in the ends of a recess 14, in each worm wheel. A squared and projecting extremity T for the worm screw serves to operate the same.

The engaging surfaces of the platforms 7, 7, and hollow sheet metal lugs 10, 10, are oppositely inclined, as shown in Fig. 5, so that when forced together a strong pressure is exerted to force the rims apart, and to force the inner rim upon the felly of the wheel, in a radial direction. Each worm screw is moved in turn to operate its respective equalizing device until all are tightly secured and the rims are brought into line with each other at their outer edges. The effect of this action is to spring or buckle inwardly the intermediate portions of the outer rim so as to engage with the inner rim between the equalizing devices as shown at L Fig. 4 and thus bind the rims together at the intermediate points of contact of the wedging blocks.

The platform and wedge blocks 10, 10, as stated are formed of sheet metal such as steel, and are provided with integral rivets R, R, which are riveted over openings S, S in the rims.

The wedge blocks or hollow sheet metal lugs 10, 10 are shown smaller at their inner ends than at their outer ends so that they can be readily inserted in the openings in the channel rim, and their outer ends completely fill these openings when they are in place, and the parts are secured together.

The various forms of construction may be changed to some extent without departing from the principle of action herein described and will be within the scope of the claims.

Having described the invention what I claim as new and desire to secure by Letters Patent is:

1. In a demounting device for the rim and tire of an automobile wheel, a rigid inner rim, and an outer rim encircling said inner rim, spaced sheet metal blocks on the inner face of said outer rim having inclined inner engaging surfaces, sheet metal platforms having corresponding inclined engaging surfaces on said inner rim, means for bringing said inclined engaging surfaces of said rims tightly together, and thereby exerting pressure upon both of said rims, whereby said outer rim will spring or buckle and engage the other rim intermediate of said engaging surfaces of said rims.

2. In a demounting device for the tire and rim of an automobile wheel, in combination with the rim and its tire, an inner channel shaped rim, pairs of sheet metal projections upon the inner side of said outer rim, said pairs of projections spaced apart thereon and having inclined inner faces, corresponding sheet metal inclined surfaces inclosed in the channel shaped inner rim, an equalizing power device inclosed in the inner rim for each pair of projections and adapted to engage and move said pair of projections and outer rim laterally on the inner rim and to bring said rims into and out of line with each other and to force said engaging inclined surfaces on said rims over each other.

3. In a demounting device, an outer rim and an inner channel shaped metal rim, a series of worm screws mounted in the sides of the inner rim, a pair of worm wheels, in said channeled rim engaging opposite sides of each worm screw, a pair of transversely and inwardly pointing lugs upon said outer rim for each worm wheel, each worm wheel provided with shoulders adapted to engage its adjacent lug alternately, said lugs provided with inclined faces, and said inner rim provided with corresponding inclined members inclosed in said channels, adapted to engage the inclined faces on said lugs.

In testimony whereof, I hereunto set my hand this 17" day of May 1910.

WILLIAM N. BOOTH.

In presence of—
WM. M. MONROE,
M. G. NORTON.